(12) United States Patent
Arzt et al.

(10) Patent No.: US 9,290,678 B2
(45) Date of Patent: Mar. 22, 2016

(54) DEVICE HAVING CONTROLLABLE ADHESION

(75) Inventors: Eduard Arzt, Saarbruecken (DE); Robert McMeeking, Santa Barbara, CA (US)

(73) Assignee: Leibniz-Institut fuer Neue Materialien gemeinnuetzige GmbH, Saarbruecken (DE)

( * ) Notice: Subject to any disclaimer, the term of this patent is extended or adjusted under 35 U.S.C. 154(b) by 856 days.

(21) Appl. No.: 13/515,524

(22) PCT Filed: Dec. 15, 2010

(86) PCT No.: PCT/EP2010/007633
§ 371 (c)(1),
(2), (4) Date: Jun. 13, 2012

(87) PCT Pub. No.: WO2011/082779
PCT Pub. Date: Jul. 14, 2011

(65) Prior Publication Data
US 2012/0258287 A1    Oct. 11, 2012

(30) Foreign Application Priority Data
Dec. 16, 2009    (DE) .......................... 10 2009 058 651

(51) Int. Cl.
*B32B 7/12* (2006.01)
*C09J 7/00* (2006.01)

(52) U.S. Cl.
CPC .............. *C09J 7/00* (2013.01); *C09J 2201/626* (2013.01); *Y10T 156/10* (2015.01); *Y10T 428/24479* (2015.01); *Y10T 428/24562* (2015.01); *Y10T 428/24612* (2015.01)

(58) Field of Classification Search
CPC .............. Y10T 428/24612; Y10T 428/24462; Y10T 156/10; Y10T 428/24562; C09J 7/00; C09J 2201/626
See application file for complete search history.

(56) References Cited

U.S. PATENT DOCUMENTS

| | | | |
|---|---|---|---|
| 5,897,930 A | 4/1999 | Calhoun et al. | |
| 6,159,596 A | 12/2000 | Calhoun et al. | |
| 6,838,142 B2 | 1/2005 | Yang et al. | |
| 6,916,116 B2 | 7/2005 | Diekmann et al. | |

(Continued)

FOREIGN PATENT DOCUMENTS

| | | |
|---|---|---|
| DE | 10001135 A1 | 7/2001 |
| DE | 10 2006 050 365 A1 | 4/2008 |

(Continued)

OTHER PUBLICATIONS

Johnson, K. L, "The Adhesion of Two Elastic Bodies with Slightly Wavy Surfaces," International Journal of Solids and Structures, Nov. 19, 2007, pp. 423-430, vol. 32.

(Continued)

*Primary Examiner* — Donald J Loney
(74) *Attorney, Agent, or Firm* — Cahn & Samuels, LLP

(57) ABSTRACT

A combination includes a first device and a second device, wherein both devices comprise at least one surface and the surface of the first device comprises at least one recess. At least one contact surface is formed when the surface of the first device attaches to the surface of the second device. By applying external pressure, the adhesion force between the two devices can be switched back and forth between at least two states.

13 Claims, 6 Drawing Sheets

(56) References Cited

U.S. PATENT DOCUMENTS

| | | |
|---|---|---|
| 7,144,616 B1 * | 12/2006 | Unger et al. ........... 428/172 |
| 2003/0077423 A1 * | 4/2003 | Flanigan et al. ........... 428/166 |
| 2004/0229014 A1 | 11/2004 | Schulz et al. |
| 2008/0111037 A1 | 5/2008 | Carnevali |
| 2009/0274877 A1 | 11/2009 | Chan et al. |
| 2010/0080951 A1 | 4/2010 | Del Campo Becares et al. |

FOREIGN PATENT DOCUMENTS

| | | |
|---|---|---|
| WO | 2005014745 A1 | 2/2005 |
| WO | 2008049517 A1 | 5/2008 |
| WO | 2008/121784 A9 | 10/2008 |

OTHER PUBLICATIONS

Translation of the International Preliminary Report on Patentability, PCT App. No. PCT/EP2010/007633, dated Jul. 2012.
English Abstract of WO 2008049517.
English Abstract of WO 2005014745.
English Abstract of DE 10001135.
Johnson, K. L., et al., "Surface Energy and the Contact of Elastic Solids," Proc. R. Soc. Lond., 1971, pp. 301-313, vol. 324.
Johnson, K. L., "The Adhesion of Two Elastic Bodies with Slightly Wavy Surfaces," Int. J. Solids Structures, 1995, pp. 423-430, vol. 32, No. 3/4.
Hui, C. Y., et al., "The Mechanics of Contact and Adhesion of Periodically Rough Surfaces," Journal of Polymer Science: Part B, 2001, pp. 1195-1214, vol. 39.
Carbone, G., et al., "Adhesion and Friction of an Elastic Half-Space in Contact with a Slightly Wavy Rigid Surface," Journal of the Mechanics and Physics of Solids, 2004, pp. 1267-1287, vol. 52.
Guduru, P.R., "Detachment of a Rigid Solid from an Elastic Wavy Surface: Theory," Journal of Mechanics and Physics of Solids, 2007, pp. 445-472, vol. 55.
Nosonovsky, Michael, et al., "Multiscale Friction Mechanisms and Hierarchical Surfaces in Nano- and Bio-Tribology," Materials Science and Engineering R, 2007, pp. 162-193, vol. 58.
English abstract of DE 10 2006 050 365 A1.

* cited by examiner

DEVICE HAVING CONTROLLABLE ADHESION

This patent application is a U.S. national stage application of PCT international application PCT/EP2010/007633 filed on 15 Dec. 2010 and claims priority of German patent document 10 2009 058 651.2 filed on 16 Dec. 2009, the entirety of which is incorporated herein by reference.

FIELD OF THE INVENTION

The invention relates to devices having controllable adhesion.

BACKGROUND OF THE INVENTION

The control of the adhesion of surfaces is an important field of material sciences. Adhesion forces between surfaces can be produced in different ways. A distinction is drawn here between mechanical bonding, such as clamping and anchoring ("hook and loop fastener"), chemical bonding, such as covalent bonds or charges, and physical bonding, such as Van der Waals forces. It is precisely the physical bonding, i.e. the Van der Waals forces, that is important for many technical and biological systems.

Here, in the case of the adhesion of solid bodies, the elasticity of the bodies or of the surfaces plays an important role for the adhesive and repulsive forces that are produced. In order to describe these forces, use is frequently made of the Johnson-Kendall-Roberts model (JKR) (K. L. Johnson, K. Kendall, A. D. Roberts (1971) Surface energy and contact of elastic solid. *Proceedings of the Royal Society A.* 324, 301-313.). In this model, for example, the adhesion of a sphere to a flat surface was investigated. For example, the attraction of the sphere by Van der Waals forces leads to deformation in the direct vicinity of the surface, depending on the elasticity of the sphere, and also to deformation of the surface in this region. This deformation is limited by the rigidity of the sphere and of the surface. An equilibrium is formed between deformation and adhesion force.

This model has been developed further through numerous studies and also used already to simulate rough surfaces (K. L. Johnson (1995) The adhesion of two elastic bodies with slightly wavy surfaces. *International Journal of Solids and Structures,* 32, 423-430; C. Y. Hui, Y. Y. Lin, J. M. Baney, E. J. Kramer (2001) The mechanics of contact and adhesion of periodically rough surfaces. *Journal of Polymer Science B, Polymer Physics,* 39, 1195-1214; G. Carbone, L. Mangialardi (2004) Adhesion and friction of an elastic half-space in contact with a slightly wavy rigid surface. *Journal of Mechanics and Physics of Solids,* 52, 1267-1287; P. R. Guduru (2007) Detachment of a rigid solid from an elastic wavy surface: Theory. *Journal of the Mechanics and Physics of Solids,* 55, 445-472.).

A still unsolved problem here is the control of the adhesion forces between two solid bodies.

The object of the invention is to specify a combination of a first and a second device. The combination is to permit the adhesion forces between the two devices to be controlled. In addition, the invention is to specify a device which permits control of the adhesion, and also a corresponding method.

SUMMARY OF INVENTION

This object is achieved by the inventions having the features of the independent claims. Advantageous developments of the inventions are characterized in the sub claims. The wording of all the claims is hereby made the content of this description by reference. The invention also covers all practical and in particular all the mentioned combinations of independent and/or dependent claims.

The invention relates to a combination of a first device and a second device, both devices having at least one surface and the surface of the first device having at least one recess; and, when the surface of the first device attaches to the surface of the second device, at least one contact area being formed. Here, contact area is understood to mean the area covered by the attachment of the first device on the surface of the second device from the view of the second device.

On this surface, the first device has at least one recess. Here, a recess is understood to mean an inwardly directed deviation of the surface, in particular from an ideal geometric surface. Such a recess can be formed very differently here. It is generally defined via its extent and via its depth profile. The extent of a recess is the area of the region of the surface without any recess which is assumed by the recess. In the case of a flat surface, this would be the area of the surface without any recess which is cut out by the recess from the surface without any recess.

The extent can be shaped regularly or irregularly. It can be different in length and width. It can be shaped geometrically, such as elliptical, polygonal, rectangular, square, circular, star-shaped, but also irregularly.

The depth profile of the recess can be symmetrical, such as pyramidal, hemispherical or curved inward, or asymmetrical.

The surface of the first device can contain a multiplicity of recesses. These can be arranged in a regular pattern, for example, such as hexagonal, tetragonal. The distances between the recesses can be greater or smaller than the extent of the respective recesses; a close arrangement of the recesses beside one another is preferred. Here, close means that there is no greater distance between two recesses than the greatest diameter of the two recesses. It is also possible for different recesses to be arranged on the same surface.

The surface of the first device can also comprise a coating, the coating having at least one recess. The coating is then advantageously at least as thick as the maximum depth of the recess. If the coating completely contains the at least one recess, the statements relating to the material characteristics do not apply to all of the first device but to the material of the coating.

The surface of the first device, which has at least one recess, is advantageously a micro-structured or nano-structured surface. Here, a microstructure is understood to mean a structure which has at least one dimension which is smaller than one millimeter but greater than one micrometer. In a corresponding way, nano-structures have at least one dimension which is smaller than a micrometer but greater than a nanometer. The recesses are part of the structuring of the surface. The recesses therefore have at least one dimension which corresponds to the structuring of the surface.

The greatest depth of a recess can lie between 5 nm and 10 mm. Preference is given to a maximum depth between 10 nm and 10 μm. The depths can also lie in the macro range, for example below 1 cm, for example between 1 μm and 1 cm.

The greatest diameter of the recess can lie between 10 nm and 10 mm. Preference is given to a greatest diameter between 10 nm and 10 μm. The diameter can also lie in the macro range, for example between 1 mm and 10 cm.

Here, these are advantageously flat recesses. Thus, the ratio of their greatest diameter to their greatest depth is more than 2:1, preferably more than 10:1.

Advantageously, the recesses have a smooth course to the surface. This means that they have a common tangent at the transition to the surface. The recesses merge into the surface without any edge or step.

In the combination, the second device is attached to the surface of the first device, which has the at least one recess. Here, attachment includes any form of making contact between surfaces. The contact area is formed in the process. In this contact area, it is necessary to distinguish between two regions. The common contact area is an area which is common to both surfaces, i.e. where there is direct contact. Here, direct means that the two surfaces touch. As a result of the recesses, it occurs that this contact area in the at least one recess has at least one region which has not formed any common contact area with the surface of the second device, for example if the attached surface of the second device at least partly covers the at least one recess in the surface of the first device. The at least one recess is preferably covered completely by the contact area. This means that the recess is closed as a result of the attachment of the surface of the second device.

The surface of the second device is preferably an area without structuring; in particular it has no kind of structure which specifically interacts with specific regions of the surface of the first device, such as elevations or hooks specifically matched to the recess. This means that there is no preferred alignment of the two surfaces with respect to each other. Thus, as distinct from a hook and loop fastener, there are no special hooks and eyes which have to find one another.

As already explained, Van der Waals or capillary forces occur between the surfaces. During and after the attachment, in particular in the regions without any common contact area in which there is the smallest distance between the two surfaces, adhesion forces occur between the surface of the recess and the surface of the second device. As a result of the elasticity of at least one of the two surfaces, it is therefore possible for further attachment and for an enlargement of the common contact area to occur and also a corresponding reduction in the size of the regions without any common contact area. Even without any external pressure, a stable equilibrium state is formed in this way, in which the adhesion forces and the forces counteracting the deformation are cancelled. This state can be established either with a constant external pressure and/or tension on at least one of the devices or else without any external pressure, and also if the external pressure and/or tension is dispensed with following the formation of the at least one common contact area. In said state, the common contact area and the at least one region without any common contact area remain constant over time. The size of the common contact area in this state also determines the energy to be applied for the purpose of detachment.

In principle, the adhesion force between the surfaces leads to the surface of the second device having to be pressed into the recess or being drawn in and/or the recess flattening somewhat. In the limiting case, this leads to the whole of the recess being filled by the second device deformed by the adhesion force on account of the adhesion forces. If the elasticity of at least one of the two devices is lower, it is also possible for only part of the recess to be filled. This can also be caused by included air.

In a further embodiment of the invention, the at least one region without any common contact area can be reversibly enlarged or made smaller by pressure or tension exerted on at least one of the devices. As a result, the common contact area is reduced in size or enlarged in a corresponding way.

In a further embodiment of the invention, the common contact area can be changed reversibly to at least one further state by means of pressure or tension exerted on at least one of the devices. This state can be a further equilibrium state but also a state in which the common contact area is maximized. This can be the case, for example, when high adhesion forces lead to the region without any common contact area disappearing completely in a recess and thus the recess being filled completely. After that, further enlargement of the common contact area in this recess is no longer possible. The common contact area is maximal for this recess. This can also mean that included air or a further equilibrium state prevents the further enlargement.

It is important that this state, just like the first equilibrium state, is maintained after it has been established, without the action of external force. Advantageously, the region without any common contact area is small or has vanished completely in the second state. This means that, in this state, the common contact area is larger and therefore the adhesion between the two surfaces is also more intense. The combination can be transformed reversibly to and fro between the two states by means of tensile or compressive forces. When a tensile force is applied, as a result of cancellation of the adhesion in specific regions, the production of regions without any common contact area occurs again. The first equilibrium state can therefore be reached again. Such a behavior having two states is also designated bistable adhesion.

This means that the combination can be switched to and fro between at least two states of different adhesion. In the event of a first attachment with low or no external pressure, the first equilibrium state is formed by adhesion of the surfaces, in which state the contact area in the at least one recess still has at least one region which has not formed any common contact area. When further pressure is applied, the combination can be changed from the first equilibrium state to the second equilibrium state. In this state, the common contact area is larger and the adhesion forces are therefore more intense. A higher force must be applied in order to detach the surfaces completely. The combination is thus a combination having controllable adhesion.

The first state is advantageously an equilibrium state and the second state is the state in which the common contact area is maximal. This is a combination having bistable adhesion.

The material of the surface of the first device is preferably a material which permits the production of relief structures of the aforementioned orders of magnitude. They can be embossing methods, for example, such as roll embossing methods, hot embossing or reactive embossing, punching methods or lithographic methods. The method used determines the materials used.

They can be, for example, organic or inorganic polymers, such as polyacrylic acid, polymethyl acrylic acid, polyacrylates, polymethyl acrylates, polyolefines, polystyrene, polyamides, polyimides, polyvinyl compounds, such as polyvinyl chloride, polyvinyl alcohol, polyvinyl butyral, polyvinyl acetate and corresponding copolymers, for example poly(ethylene vinyl acetate), polyesters, for example polyethylene terephthalate or polydiallyl phthalate, polyarylates, polycarbonates, polyethers, for example polyoxymethylene, polyethylene oxide, polyphenylene oxide, polyetherketones, polysulfones, polyepoxides and fluoropolymers, for example polytetrafluoroethylene or polysiloxanes. They can also be cationically or anionically polymerizable polymers. It is also possible for composite materials to be used which are composed of organic and inorganic constituents, such as organically modified inorganic polycondensates, which can also contain nano-particles. Examples of materials are cited, for example, in WO 2005/014745 A1 or DE 100 01 135 A1, to which reference is hereby explicitly made.

The surfaces advantageously have a modulus of elasticity of at least 1 MPa, preferably between 1 MPa (PDMS; polydimethyl siloxane) and 10 GPa (solid keratin). Here, it is preferable for the first device to have a higher modulus of elasticity than the second device. The modulus of elasticity can be determined with the aid of an indentation trial or an adhesion trial.

In a further embodiment of the invention, in the case of an axially symmetrical recess, the combination satisfies the following equation $$\frac{\delta_0^2 E^*}{b w_0} > 2\pi,$$

and $E^*$ the combined modulus of the two devices in accordance with $$\frac{1}{E^*} = \frac{1-v_1^2}{E_1} + \frac{1-v_2^2}{E_2},$$

where $E_1$ and $E_2$ are the moduli of elasticity of the first and second device, respectively, and $v_1$ and $v_2$ are the Poisson numbers of the two devices or their surfaces. b is the effective radius of the recess.

Starting from these relationships, many combinations of recesses and materials which exhibit such at least bistable adhesion can be found.

The recesses can have still further properties. For instance, the materials of the devices can be porous, for example, in order to permit the escape of air. In addition, for example by means of micro-fluidics, it is possible for the depth of the recesses to be controllable. In this way, the adhesion force in the at least two states would additionally be controllable.

The invention also relates to a device having a structured surface with controllable adhesion to a surface. This device corresponds substantially to the first device of the combination described above. In particular starting from the aforementioned relationships, it is readily possible, given knowledge of the characteristics of the devices having the structured surface, to find suitable surfaces on which at least bistable adhesion occurs. By means of pressure on the device, it is possible to change between the at least two states with different adhesion force.

The respective surfaces, in addition to increasing (or reducing) the adhesion itself, can also be micro-structured, as described for example in WO 2008/049517 A1.

The invention additionally relates to a method for controlling the adhesion of a combination.

Individual method steps will be described in more detail below. The steps do not necessarily have to be carried out in the order indicated, and the method to be outlined can also comprise further steps not mentioned.

To this end, in the first step, in a combination as described above, the surface with a recess of the first device is attached to the surface of the second device. The common contact area is formed in the process. If appropriate, it is necessary to press the surfaces against each other with a specific pressure. As a result of the attachment and possible application of a specific compressive stress, the first state having a region without any common contact area can be produced. If the compressive stress is lower, an equilibrium state will be reached, depending on the material constants.

In a further step, a compressive stress which is higher than the first compressive stress is applied. As a result, the at least one further state of the combination is formed. Since, in this state, the common contact area is larger, the adhesion of the two devices is also correspondingly higher. If appropriate, the first state can be reached again by applying a tensile stress.

The combinations or devices described can be used very differently. Applied to films, plates or surfaces, such surface structures can permit these films, plates or surfaces to be applied to the surfaces first and, only when the position is suitable, by increasing the pressure, permit the contact area to be brought into the further or second state with higher adhesion and thus to be fixed finally. They are suitable for use in the home or industry but also in clothing. Large-area applications are possible. For example, the recesses can be applied in a straightforward manner to films.

Further details and features can be gathered from the following description of preferred exemplary embodiments in conjunction with the sub claims. Here, the respective features can be implemented on their own or in a plurality in combination with one another. The possible ways of achieving the object are not restricted to the exemplary embodiments. For instance, statements of ranges always cover all intermediate values—not mentioned—and all conceivable partial intervals.

BRIEF DESCRIPTION OF THE DRAWINGS

The exemplary embodiments are illustrated schematically in the figures. Identical designations in the individual figures designate identical or functionally identical elements or those which correspond to one another with regard to their functions. In detail:

FIG. 3 shows a cross section through the attached surfaces with a region without any common contact area having the radius a;

Figure 6:
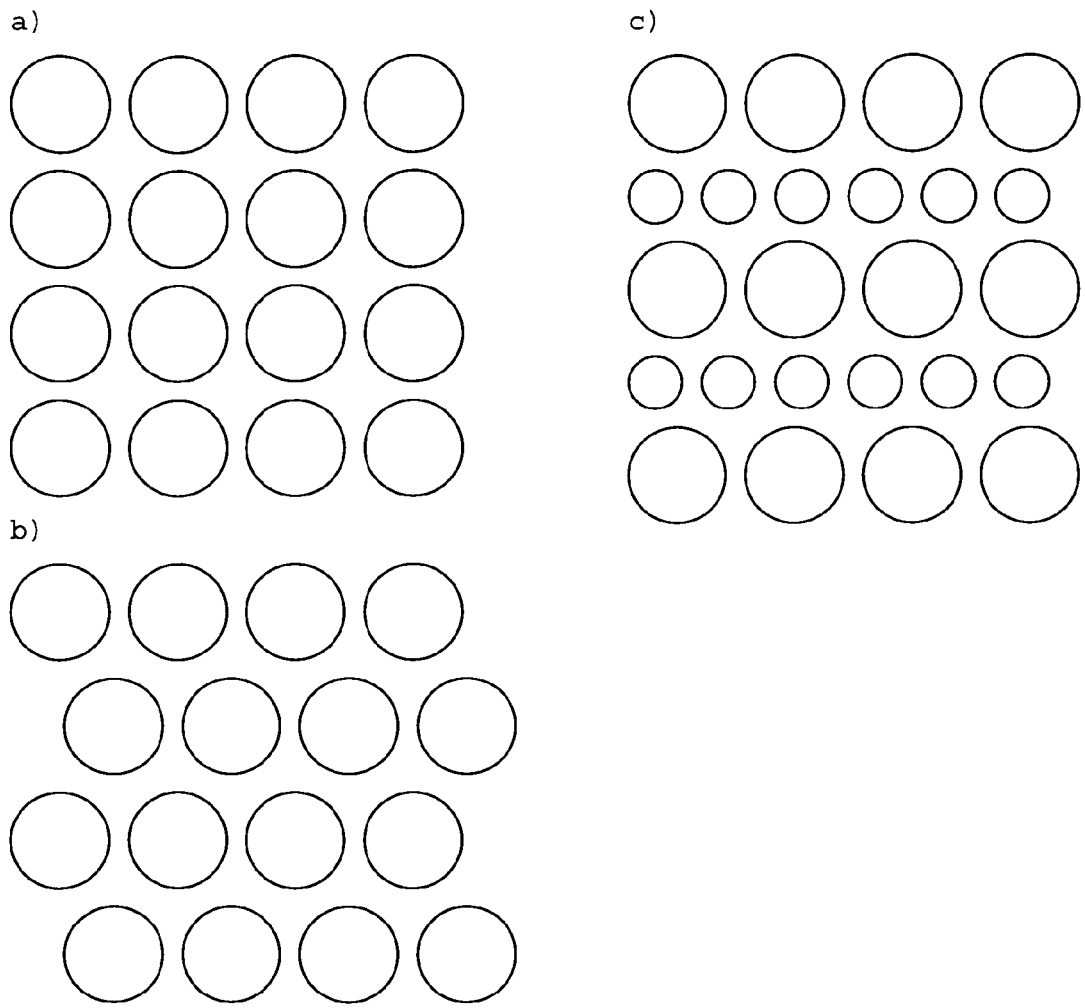

and the radius $a_m$;

FIG. 6 shows various arrangements of a plurality of recesses.

DETAILED DESCRIPTION OF INVENTION

In the following text, the functioning of the combination and the device for controlling the adhesion will be described by using the example of an axially symmetrical recess. This serves merely to illustrate the action according to the invention but does not constitute any restriction to the geometry of the recess used as a model. Instead, highly different geometries can be used.

Figure 1:
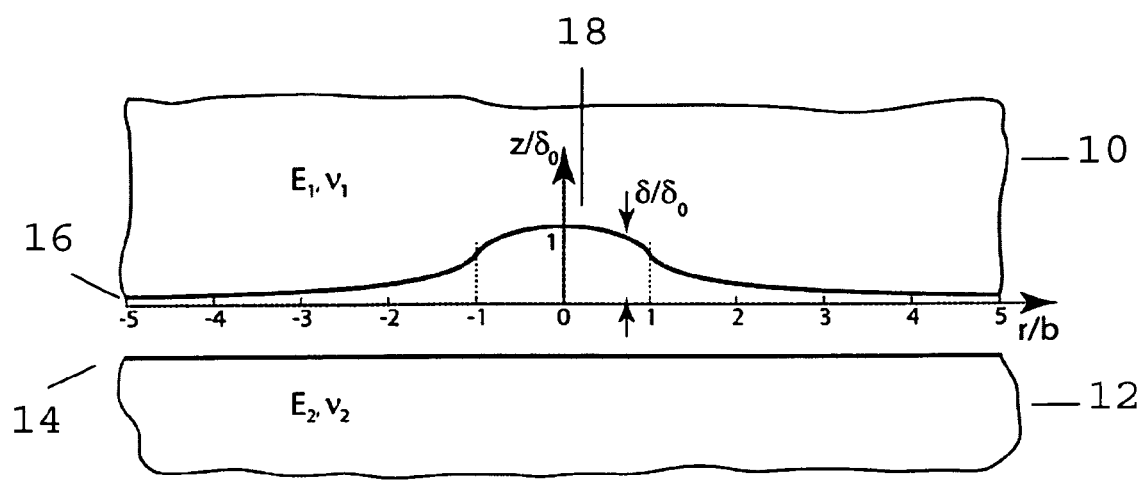
FIG. 1 shows a depiction of the cross section through a recess having the depth profile according to formula 1a and 1b.

By way of example, the recess 18 can be described by the following formulas $$\delta = \frac{2}{\pi} \delta_0 \varepsilon\left(\frac{r}{b}\right) \text{ for } \frac{r}{b} \leq 1 \text{ and} \tag{1a}$$

$$\delta = \frac{2}{\pi} \delta_0 \left[ \varepsilon\left(\frac{b}{r}\right) - \left(1 - \frac{b^2}{r^2}\right) \kappa\left(\frac{b}{r}\right) \right] \text{ for } \frac{r}{b} \geq 1,, \tag{1b}$$

where $\delta_0$ is the maximum depth and $\varepsilon(\theta)$ is the elliptical integral of second type of the variable $\theta$ and $\kappa(\theta)$ is the elliptical integral of first type of the variable $\theta$. b is the effective radius of the recess. A schematic illustration of the recess will be found in FIG. 1. A structure-free surface 14 of the second device 12 is attached to this surface 16 of the first device 10.

If the surface having the at least one recess 16 is brought into contact with the surface 14 of the second device, adhesion forces act, which can be described by the work of adhesion ($w_0$), i.e. the reduction in the potential energy per unit of attachment area in accordance with the formula $$w_0 = \gamma_1 + \gamma_2 - \gamma_{12},$$

where $\gamma_1$ is the surface energy of the first device 10 and $\gamma_2$ is the surface energy of the second device 12 and $\gamma_{12}$ is the interface energy of the two surfaces upon contact. These values can be determined via measuring methods, such as contact angle measurements.

Both devices are, at least on the surfaces, advantageously linearly elastic and possibly isotropic with the moduli of elasticity $E_1$ and $E_2$ of the first and second devices, respectively, and $v_1$ and $v_2$ are the respective Poisson numbers. In the case of a coating, the information for the material of the respective coating of the devices applies.

The recess 18 is viewed as flat ($\delta_0 \ll b$), so that elastic deformation brought about by tensile forces on the device having the recess can be calculated as deformation of the second device 12 having a flat surface 14. Thus, the surface distortions of a half-space having a flat surface in the z direction when a uniform pressure p acts on a circular area having the radius b on this half space are given by the formulas 1a, 1b, $\delta_0$ being replaced by $2pb/E'$, the deformations resulting in the same direction as p and being defined as $E'=E/(1-v^2)$ (E is the modulus of elasticity and v the Poisson number of the material of the half-space). From this, it follows that it is possible for the shape of the surface having the recess 16 and the shape of the surface of the second device 14 to be equalized when both are subjected to a tensile force T on their surfaces, the tensile force acting within an originally symmetrical area of the radius b, where $$T = \frac{\delta_0^2 E^*}{b}$$

and $E^*$ is the combined modulus of the two devices according to $$\frac{1}{E^*} = \frac{1-v_1^2}{E_1} + \frac{1-v_2^2}{E_2}.$$

Figure 2:
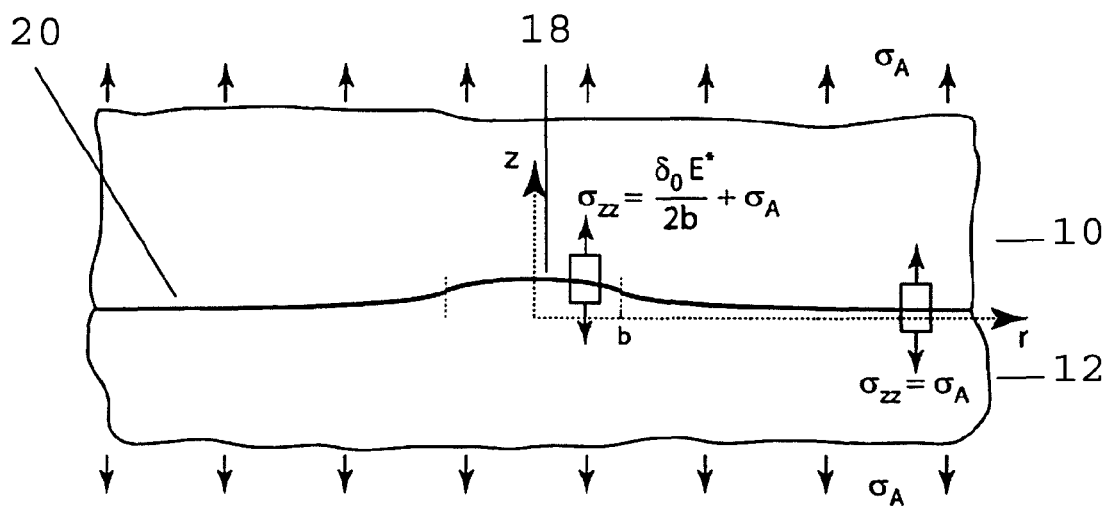
FIG. 2 shows a cross section through the attached surfaces with a tensile stress applied. The forces at the interface are indicated.

If the two surfaces adhere completely to each other and a tensile stress acts, as shown in FIG. 2, the tensile stress at the interface is given by the equation $$\sigma_{zz} = \sigma_A + \frac{\delta_0 E^*}{2b} \text{ for } \frac{r}{b} \leq 1 \text{ and} \tag{2a}$$

$$\sigma_{zz} = \sigma_A \text{ for } \frac{r}{b} \geq 1 \tag{2b}$$

where $\sigma_A$ is the tensile force acting or applied. No shear forces of any kind act on the common contact area 20.

Therefore, a common contact area 20, which also completely includes the surface of the recess, has been formed between the two surfaces. In this case, the contact area 24 corresponds to the common contact area.

Figure 3:
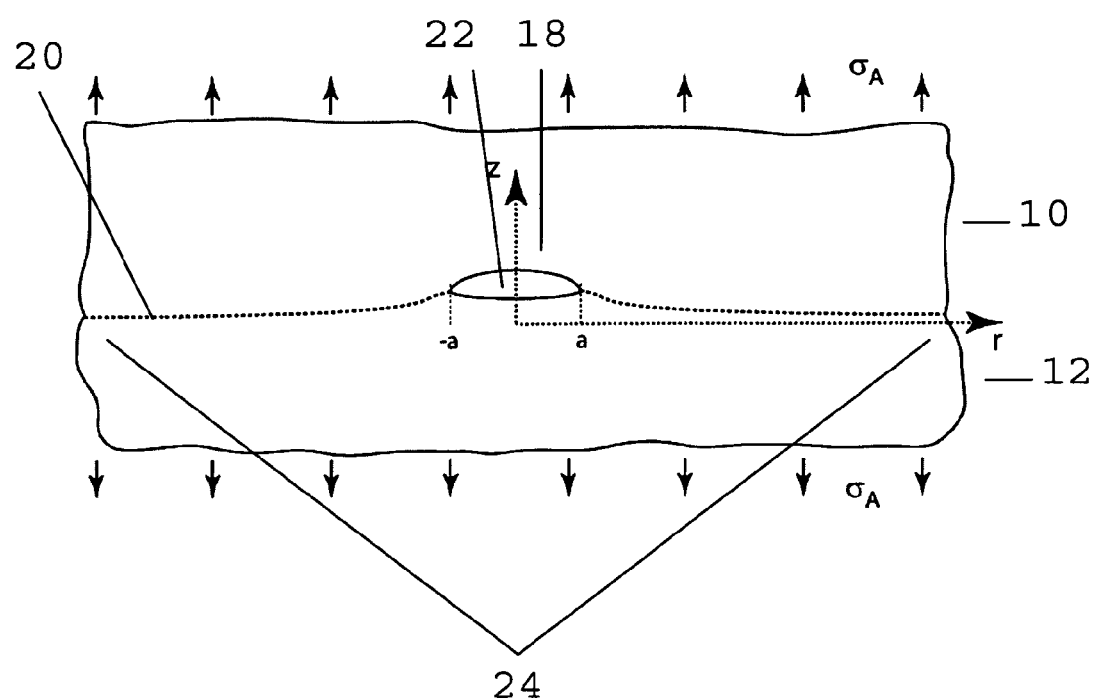

If, in the recess, there is now a region 22 which has not formed any common contact area with the surface of the second device, a situation as in FIG. 3 is present. This region is part of the contact area 24. In this region ($r \leq a$), tensile stresses no longer act. Taking fracture mechanics into account, the mode I stress intensity factors at the edge of the region 22 without any common contact area can be calculated:

$$K_1 = \frac{2}{\pi}\left(\sigma_A + \frac{\delta_0 E^*}{2b}\right)\sqrt{\pi a} \text{ for } a \leq b \text{ and} \tag{3a}$$

$$K_1 = \frac{2}{\pi}\left[\sigma_A + \frac{\delta_0 E^*}{2b}\left(1 - \sqrt{1 - \frac{b^2}{a^2}}\right)\right]\sqrt{\pi a} \text{ for } a > b. \tag{3b}$$

Since no shear forces occur, the stress intensity factors for mode II and mode III can be disregarded. The energy liberation rate G at the edge of the region 22 without any common contact area accordingly is thus given by K. L. Johnson (1985) The adhesion of two elastic bodies with slightly wavy surfaces. *International Journal of Solids and Structures*, 32, 423-430:

$$G = \frac{K_1^2}{2E^*} \tag{4}$$

In the case of an equilibrium, the energy liberation rate corresponds to the work of adhesion $w_0$. This results in the following relationship between the tensile stress $\sigma_a$ acting at equilibrium in the case of a region 22 without any common contact area having the radius a:

$$\sigma_A = E^*\left(\sqrt{\frac{\pi w_0}{2aE^*}} - \frac{\delta_0}{2b}\right) \text{ for } a \leq b \text{ and} \tag{5a}$$

$$\sigma_A = E^*\left[\sqrt{\frac{\pi w_0}{2aE^*}} - \frac{\delta_0}{2b}\left(1 - \sqrt{1 - \frac{b^2}{a^2}}\right)\right] \text{ for } a > b. \tag{5b}$$

Figure 4A:
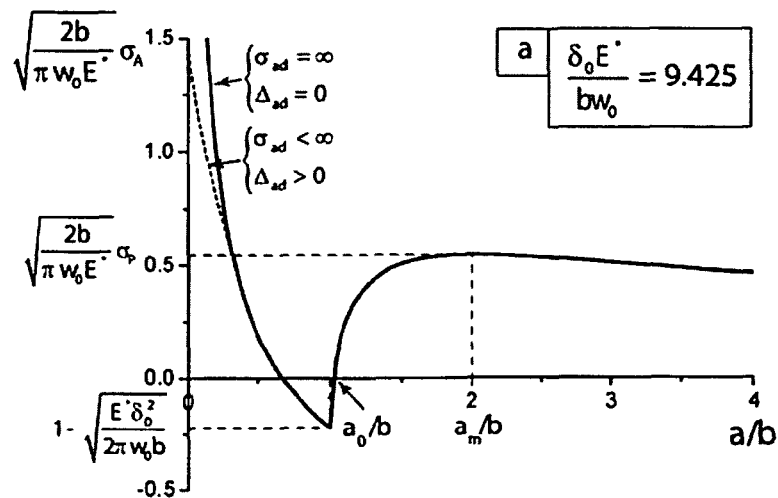
FIG. 4 shows graphs of the tensile stress $\sigma_a$ acting in equilibrium with the radius a for a work of adhesion $w_0$; (a) shows the relationship for a relatively deep recess, a high effective modulus of elasticity $E^*$ and a relatively low effective radius and a low work of adhesion; (b) shows the relationship for a relatively flat recess, a low effective modulus of elasticity, a large effective radius and high work of adhesion.
Figure 4B:
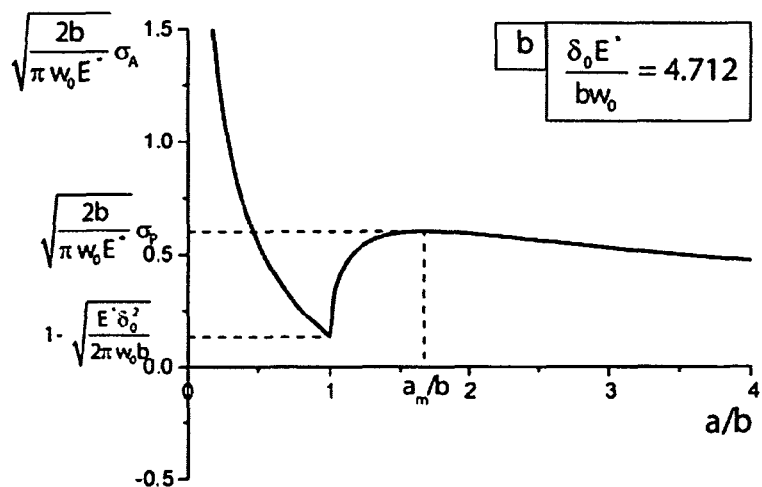

FIG. 4 shows graphs of these equations for $$\sigma_A \sqrt{\frac{2b}{\pi w_0 E^*}}$$

against a/b. A distinction is drawn between two cases here. In FIG. 4a, a graph for $$\frac{\delta_0^2 E^*}{bw_0} > 2\pi$$

is shown (a value of 9.425 has been chosen). In the graph, it is possible to see a region in which the tensile stress acting in equilibrium with the region 22 without any common contact area is compressive (i.e. is negative). In FIG. 4b, a graph for $$\frac{\delta_0^2 E^*}{bw_0} < 2\pi$$

is shown (a value of 4.712 has been chosen). The tensile stress acting in equilibrium with the region 22 without any common contact area is always pulling in this case (i.e. is positive).

Even if in the equilibrium state there is a region 22 without any common contact area, said region does not have to be present in a stable equilibrium state even under a constant tensile stress, which means that the system independently returns into this equilibrium state again in the event of slight disturbances. In the case of an unstable equilibrium state, the system no longer returns into this equilibrium state following a disturbance. Stable equilibrium states are local or global minima of the potential energy $U(a,\sigma_A)$ of the system, U being made up of contributions from the elasticity, surface and interface energy and the potential energy of the tension acting. From fracture mechanics, the following results:

$$\frac{\partial U}{\partial a} = 2\pi a [w_0 - G]$$

Here, this term must become 0 at equilibrium ($w_0$=G). A stable equilibrium therefore results from the condition $$\frac{\partial G}{\partial a} < 0.$$

From the equations 4 and 3a, the result is that the equilibriums for the case a<b are unstable equilibriums, which is also known from fracture mechanics. From equations 4, 3b and 5b, the result for a stable equilibrium is:

$$\frac{\partial G}{\partial a} = -\sqrt{\frac{8w_0 a}{\pi E^*}} \frac{\partial \sigma_A}{\partial a} \tag{7}$$

This means that, at the stable equilibrium, the gradient of the energy liberation rate in relation to the radius of the region 22 without any common contact area has an inverse sign as compared with the gradient of the tensile stress that acts. A stable equilibrium can therefore exist only in the range $b<a<a_m$, (see FIG. 4), where $a_m$ is the radius of the region without any common contact area, where the tensile stress has its maximum at equilibrium. This means that, for values in this interval, there is an equilibrium at which the region 22 without any common contact area remains constant even without any tensile stress acting. For values outside this interval, the equilibrium is unstable.

Figure 5:
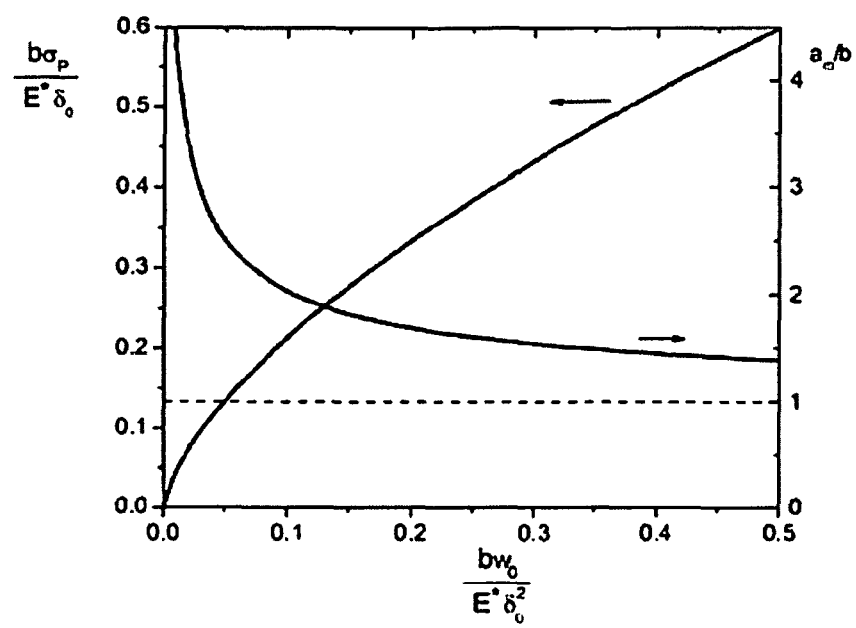
FIG. 5 shows graphs of the tensile force $\sigma_p$ needed to detach the surfaces as a function of $$\frac{w_0 b}{\delta_0^2 E^*}$$

This means that an adhesion without any tensile stress acting forms a region 22 of radius $a_0$ without any common contact area. If an increasing tensile stress then acts, as shown in FIG. 4a, the radius will increase slowly, i.e. the size of the region 22 without any common contact area enlarges. This takes place until $a_m$ is reached. After that, any increase in the tensile stress leads to an unstable equilibrium state, that is unstable propagation of the region 22 without any common contact area. The two surfaces detach from each other. Even the subsequent reduction in the tensile stress cannot stop this, since even very small effects disturb the unstable equilibrium again. The relationship between the tensile stress at $a_m$ ($\sigma_p$) and $$\frac{w_0 b}{\delta_0^2 E^*}$$

is shown by FIG. 5. $\sigma_p$ can be obtained by inserting $a_m$ into equation 5b.

FIG. 4 also discloses a particular behavior in the event of increasing pressure on both surfaces. Firstly, the area of the region without any common contact area a decreases (a becomes smaller). However, the equilibrium becomes unstable when a assumes the value b. This means that the radius a will decrease further until it is 0, i.e. the region without any contact area is no longer present. However, as a result of included air or the depth profile of the recess, it is possible for the region without any contact area not to vanish completely. In these cases, it is only minimized, i.e. it assumes the magnitude which is minimally possible under the pressure acting. It is critical that, as already in the case of the detachment of the two surfaces, the minimization of the region without any common contact area can no longer be stopped, even if the pressure is reduced, since an unstable equilibrium is involved.

The model unambiguously exhibits bistable adhesion. In a first step, the first stable equilibrium can be achieved, either during attachment or following the application of a specific pressure. If, in a second step, more pressure is applied, the system can be changed to the second state. There, the common contact area is maximal and there is greater adhesion of the two surfaces.

According to the previous model, the tensile stress to be applied at a equal to 0 would be infinite (FIG. 4a, continuous line). This lies in inadequacies of the model used. For example, for infinitely small distances between the surfaces, infinite adhesion forces $\sigma_{ad}$ are obtained. If, instead, an approach according to Dugdale is used, then a realistic consideration of the Van der Waals forces can be used. In this case, it is assumed that, with small tensile forces, although a first region without any common contact area is formed, this region still feels the mutual attraction of the surfaces. Only when the distance between the two surfaces exceeds the value $\Delta_{ad}$ is a region without any common contact area which is free of tensile forces formed. If the radius of the region without any contact area is viewed as c and the radius of the region without any contact area without tensile forces is viewed as a, then c approaches a with increasing intensity of the tensile force acting. Thus, FIG. 4a also shows, as a dashed line, the course of the equilibrium, taking the Dugdale model ($\sigma_{ad}<\infty$;

$\Delta_{ad}$>0) into account. The two curves approach each other as the tensile force acting increases. With higher tensile forces, and above all in the first equilibrium state, no differences between the two approaches can be seen.

The situations shown also apply to other shapes of the recesses. Numerous modifications and developments of the exemplary embodiments described can be implemented.

FIG. 6 shows different arrangements of the recesses on the surface. It is also possible for recesses of different size (FIG. 6c) to be formed on the surface. Since, for each of these surfaces, with parameters that are identical apart from the size, different tensile stresses must act in order to change between the at least two states of the respective recess, it is thus possible to devise surfaces which have a total of three or more different adhesion stages.

DESIGNATIONS

10 First device
12 Second device
14 Surface of the second device
16 Surface of the first device
18 Recess in the surface of the first device
20 Common contact area
22 Region without any common contact area
24 Contact area

LIST OF LITERATURE CITED

WO 2005/014745 A1
DE 100 01 135 A1
WO 2008/049517 A1
K. L. Johnson, K. Kendall, A. D. Roberts (1971) Surface energy and contact of elastic solid. *Proceedings of the Royal Society A*. 324, 301-313.
K. L. Johnson (1995) The adhesion of two elastic bodies with slightly wavy surfaces. *International Journal of Solids and Structures*, 32, 423-430.
C. Y. Hui, Y. Y. Lin, J. M. Baney, E. J. Kramer (2001) The mechanics of contact and adhesion of periodically rough surfaces. *Journal of Polymer Science B, Polymer Physics*, 39, 1195-1214.
G. Carbone, L. Mangialardi (2004) Adhesion and friction of an elastic half-space in contact with a slightly wavy rigid surface. *Journal of Mechanics and Physics of Solids*, 52, 1267-1287.
P. R. Guduru (2007) Detachment of a rigid solid from an elastic wavy surface: Theory. *Journal of the Mechanics and Physics of Solids*, 55, 445-472.

The invention claimed is:

1. A combination, comprising:
a first and a second device, both devices each having at least one surface, the surface of the first device having at least one recess comprising an axially symmetrical recess; and
the surface of the first device being contacted to the surface of the second device by adhesion forces, so that at least one contact area is formed which comprises at least one common contact area wherein the contact area in at least one recess has at least one region which has not formed any common contact area,
wherein the combination satisfies the following equation:

$$\frac{\delta_0^2 E^*}{b w_0} > 2\pi,$$

where $\delta_0$ is a maximum depth of the at least one recess,
b is an effective radius of the at least one recess,
$w_0$ is a reduction in potential energy per unit of the common contact area, $$w_0 = \gamma_1 + \gamma_2 - \gamma_{12}$$

where $\gamma_1$ is a surface energy of the first device and $\gamma_2$ is a surface energy of the second device and $\gamma_{12}$ is an interface energy of the two devices on contact, and
E* is a combined modulus of the two devices according to $$\frac{1}{E^*} = \frac{1-v_1^2}{E_1} + \frac{1-v_2^2}{E_2}$$

where $E_1$ and $E_2$ are moduli of elasticity of the first and second device, respectively, and $v_1$ and $v_2$ are Poisson numbers of the two devices.

2. The combination as claimed in claim 1, wherein an equilibrium state is present in which the common contact area and the at least one region without any common contact area remain constant.

3. The combination as claimed in claim 1, wherein the common contact area can be changed reversibly to at least one second equilibrium state by pressure or tension exerted on at least one of the devices.

4. The combination as claimed in claim 1, wherein the surface of the first device which has at least one recess is a micro-structured or nano-structured surface.

5. The combination as claimed in claim 1, wherein the at least one recess in the surface of the first device has a depth of less than 1 cm.

6. The combination as claimed in claim 1, wherein the material of the first device has at least a modulus of elasticity of 1 MPa.

7. The combination as claimed in claim 1, wherein the surface of the first device has a multiplicity of recesses.

8. The combination as claimed in claim 7, wherein the recesses are arranged regularly.

9. A method for controlling the adhesion of a combination as claimed in claim 1, comprising:
a) attaching the surface of the first device to the surface of the second device;
b) applying a compressive stress in order to achieve at least one further state of the combination.

10. The combination as claimed in claim 7, wherein the recesses are arranged in a hexagonal arrangement.

11. The combination according to claim 1, wherein the common contact area is reversibly changeable between at least two equilibrium states of different adhesion force by pressure.

12. A method for fixing, comprising:
applying the surface of the first device in said combination according to claim 1 against a film, plate, or other surface; and
increasing pressure so that adhesion forces in the common contact area are increased.

13. A method for controlling the adhesion of a combination as claimed in claim 1, comprising:
attaching the surface of the first device to the surface of the second device to achieve a first equilibrium state in which the common contact area and the at least one region without any common contact area remain constant; and applying pressure or tension to at least one of the devices to achieve a second equilibrium state in which the common contact area is increased, wherein said combination has controllable bi-stable adhesion switchable between the first stable equilibrium state and the second equilibrium state.

* * * * *